United States Patent
Terada et al.

(10) Patent No.: US 12,206,073 B2
(45) Date of Patent: Jan. 21, 2025

(54) NONAQUEOUS ELECTROLYTE SOLUTION, NONAQUEOUS ELECTROLYTE BATTERY AND COMPOUND

(71) Applicant: CENTRAL GLASS CO., LTD., Yamaguchi (JP)

(72) Inventors: Ryosuke Terada, Ube (JP); Mikihiro Takahashi, Ube (JP); Takayoshi Morinaka, Ube (JP); Ryota Esaki, Sanyo-onoda (JP); Susumu Iwasaki, Ube (JP); Miyuki Yamauchi, Ube (JP); Wataru Kawabata, Ube (JP); Masahiro Miura, Ube (JP)

(73) Assignee: CENTRAL GLASS CO., LTD., Yamaguchi (JP)

( * ) Notice: Subject to any disclaimer, the term of this patent is extended or adjusted under 35 U.S.C. 154(b) by 499 days.

(21) Appl. No.: 17/629,085

(22) PCT Filed: Jul. 22, 2020

(86) PCT No.: PCT/JP2020/028526
§ 371 (c)(1),
(2) Date: Jan. 21, 2022

(87) PCT Pub. No.: WO2021/015264
PCT Pub. Date: Jan. 28, 2021

(65) Prior Publication Data
US 2022/0271340 A1    Aug. 25, 2022

(30) Foreign Application Priority Data

Jul. 24, 2019  (JP) .................................. 2019-136223

(51) Int. Cl.
| | |
|---|---|
| H01M 10/0568 | (2010.01) |
| H01M 10/0525 | (2010.01) |
| H01M 10/0569 | (2010.01) |

(52) U.S. Cl.
CPC ... *H01M 10/0568* (2013.01); *H01M 10/0525* (2013.01); *H01M 10/0569* (2013.01); *H01M 2300/0028* (2013.01)

(58) Field of Classification Search
CPC ......... H01M 10/0568; H01M 10/0525; H01M 10/0569; H01M 2300/0028
See application file for complete search history.

(56) References Cited

U.S. PATENT DOCUMENTS

| | | |
|---|---|---|
| 6,413,678 B1 | 7/2002 | Hamamoto et al. |
| 2002/0168576 A1 | 11/2002 | Hamamoto et al. |
| 2004/0106047 A1 | 6/2004 | Mie et al. |
| 2012/0308881 A1 | 12/2012 | Tokuda et al. |
| 2013/0280622 A1 | 10/2013 | Tokuda et al. |

FOREIGN PATENT DOCUMENTS

| | | | |
|---|---|---|---|
| CN | 101743656 A | * 6/2010 | ............ H01M 2/027 |
| CN | 103935970 | 7/2014 | |
| EP | 3 261 166 | 12/2017 | |
| EP | 3 396 771 | 10/2018 | |
| JP | 3438636 | 8/2003 | |
| JP | 3439085 | 8/2003 | |
| JP | 2013-152956 | 8/2013 | |

OTHER PUBLICATIONS

Machine Translation of CN-101743656-A (Jul. 26, 2024) (Year: 2024).*
("Novel divalent organo-lithium salts with high electrochemical and thermal stability for aqueous rechargeable Li-Ion batteries", Electrochimica Acta 298 (2019) 709-716) (Dec. 29, 2018) (Year: 2018).*
International Search Report issued Oct. 13, 2020 in International (PCT) Application No. PCT/JP2020/028526.
Office Action issued Jul. 5, 2024 in European Patent Application No. 20 843 677.4.

* cited by examiner

*Primary Examiner* — Matthew J Merkling
(74) *Attorney, Agent, or Firm* — Wenderoth, Lind & Ponack, L.L.P.

(57) ABSTRACT

The present invention provides: a nonaqueous electrolyte solution which is used in a nonaqueous electrolyte battery having a low initial resistance value; and a compound which is contained in this nonaqueous electrolyte solution. A nonaqueous electrolyte solution according to the present invention contains a compound represented by formula (1), a solute and a nonaqueous organic solvent. In general formula (1), each of $R^1$ and $R^2$ represents $PO(R_f)_2$ or $SO_2R_f$, and Rf represents, for example, a fluorine atom; each of $R^3$ and $R^4$ represents, for example, a lithium ion, or alternatively $R^3$ and $R^4$ may form a ring structure together with a nitrogen atom to which the moieties are bonded, and in this case, $R^3$ and $R^4$ form an alkylene group in combination with each other; an oxygen atom may be contained between carbon atom-carbon atom bonds in the alkylene group; a side chain thereof may have an alkyl group; and an arbitrary hydrogen atom in the alkyl group and the alkylene group may be substituted by a fluorine atom.

10 Claims, No Drawings

NONAQUEOUS ELECTROLYTE SOLUTION, NONAQUEOUS ELECTROLYTE BATTERY AND COMPOUND

TECHNICAL FIELD

The present invention relates to a nonaqueous electrolyte solution, a nonaqueous electrolyte battery, and a compound.

BACKGROUND TECHNOLOGY

For batteries as electrochemical devices, in recent years, storage systems to be applied to small equipment that needs high energy density, such as information-technology-related equipment or communication equipment, specifically, personal computers, video cameras, digital still cameras, cell phones and smartphones and storage systems to be applied to large equipment that needs high power, such as auxiliary power and energy storage for electric vehicles, hybrid electric vehicles and fuel cell electric vehicles have attracted attention. Currently, a nonaqueous electrolyte battery, including a lithium ion battery with high energy density and voltage and large capacity, has been actively studied and developed as a candidate thereof.

As a nonaqueous electrolyte solution used for such nonaqueous electrolyte batteries, a nonaqueous electrolyte solution obtained by dissolving a fluorine-containing electrolyte such as lithium hexafluorophosphate (hereinafter $LiPF_6$), lithium bis(fluorosulfonylimide) (hereinafter LFSI) or lithium tetrafluoroborate (hereinafter $LiBF_4$) as a solute in a solvent such as a cyclic carbonate, a chain carbonate or an ester is suitable to obtain a battery with high voltage and large capacity, and thus frequently used. However, nonaqueous electrolyte batteries using such a nonaqueous electrolyte solution do not necessarily have satisfactory battery characteristics such as cycle characteristics and output characteristics.

In the case of lithium ion secondary batteries, for example, when the lithium cation is inserted into a negative electrode at the initial charge, the negative electrode and the lithium cation, or the negative electrode and the solvent of an electrolyte solution react to form a film having lithium oxide, lithium carbonate and/or lithium alkyl carbonate as a main component on the negative electrode surface. This film on the electrode surface is called Solid Electrolyte Interface (SEI), and the properties thereof have large influences on battery performance, for example, suppressing further reduction decomposition of a solvent and suppressing the deterioration of battery performance. Similarly, a film is also formed on the positive electrode surface from decomposed products, and it is known that this film also suppresses the oxidative decomposition of a solvent and plays an important role in, for example, suppressing the generation of gas inside the battery.

In order to improve durability such as cycle characteristics and high temperature storage characteristics and battery characteristics including input and output characteristics, it is important to form a stable SEI having a high ion conductivity and a low electron conductivity, and an attempt to positively form a good SEI has been widely made by way of adding a small amount of a compound called an additive to an electrolyte solution (usually 0.001 mass % or more and 10 mass % or less).

The optimization of various battery components including active materials of a positive electrode and a negative electrode has been investigated as a means for improving durability such as cycle characteristics and high temperature storage characteristics of nonaqueous electrolyte batteries until now. Technologies related to nonaqueous electrolyte solutions are no exception, and it has been proposed that deterioration due to the decomposition of a nonaqueous electrolyte solution on the active positive electrode and negative electrode surfaces is suppressed by various additives.

Patent Literature 1 proposes that battery characteristics such as high temperature storage characteristics are improved by adding vinylene carbonate to a nonaqueous electrolyte solution. This method prevents the decomposition of a nonaqueous electrolyte solution on electrode surfaces by way of coating electrodes with polymer films formed due to polymerization of vinylene carbonate; however, lithium ion is also difficult to pass through this film and thus there is a problem of an increase in internal resistance.

In order to solve this problem, the addition of lithium difluorophosphate disclosed in Patent Literature 2 is effective, and it is known that batteries, in which an increase in internal resistance is suppressed while simultaneously high storage characteristics at high temperatures are maintained, are obtained by using vinylene carbonate and lithium difluorophosphate in combination.

Patent Literature 3 discloses a method for improving input and output characteristics and impedance characteristics by causing a nonaqueous electrolyte solution to contain a fluorosulfonic acid salt as a single additive, not a combination of a plurality of additives.

PRIOR ART REFERENCES

Patent Literature

Patent Literature 1: JP-B-3438636
Patent Literature 2: JP-B-3439085
Patent Literature 3: JP-A-2013-152956

SUMMARY OF INVENTION

Subject to be Attained by the Invention

As a result of the examination by the present inventors, the present inventors have found that the effect of suppressing an increase in internal resistance is low even when lithium difluorophosphate is added to a nonaqueous electrolyte solution including vinylene carbonate, and that the effect of improving initial input and output characteristics is low even when a nonaqueous electrolyte solution comprising lithium fluorosulfonate described in Patent Literature 3 was used. In this way, there has been room for examination of resistance characteristics, particularly initial resistance characteristics.

The present invention has been made in view of the above circumstances, and the subject to be attained by the present invention is to provide a nonaqueous electrolyte solution which can provide a low initial resistance value when it is used in a nonaqueous electrolyte battery. Another subject to be attained by the present invention is to provide a compound which can be suitably used in the above nonaqueous electrolyte solution.

Means for Attaining the Above Subject

As a result of intense and diligent studies in view of such subjects, the present inventors have found that a nonaqueous electrolyte battery providing a low initial resistance value when it is used in a nonaqueous electrolyte battery is obtained by causing a nonaqueous electrolyte solution to comprise a compound represented by the general formula (1) which will be explained in detail below, a solute, and a nonaqueous organic solvent, thereby completing the present invention.

That is, the present inventors found that the above subjects can be attained by the following constitutions.

[1] A nonaqueous electrolyte solution, comprising a compound represented by the following general formula (1), a solute, and a nonaqueous organic solvent:

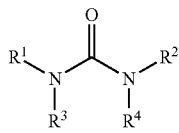
(1)

[in the general formula (1), $R^1$ and $R^2$ each independently represents $PO(R_f)_2$ or $SO_2R_f$, $R_f$s each independently represents a fluorine atom or a C1-4 linear or C3-4 branched perfluoroalkyl group, $R^3$ and $R^4$ each independently represents a hydrogen atom, a lithium ion, a sodium ion, a potassium ion, or a C1-12 linear or C3-12 branched alkyl group, wherein an oxygen atom may be included between the carbon atoms of the carbon atom-carbon atom bond in the alkyl group, or $R^3$ and $R^4$ form a ring structure together with the nitrogen atoms to which they are bound, wherein $R^3$ and $R^4$, together with each other, form an alkylene group; an oxygen atom may be included between the carbon atoms of the carbon atom-carbon atom bond in the alkylene group; a side chain thereof may have an alkyl group; and an arbitrary hydrogen atom in the alkyl group and alkylene group may be substituted by a fluorine atom, provided that in case where $R^3$ represents a lithium ion, a sodium ion or a potassium ion, a bond of the nitrogen atom and $R^3$ in the general formula (1) represents an ion bond, and in case where $R^4$ represents a lithium ion, a sodium ion or a potassium ion, a bond of the nitrogen atom and $R^4$ in the general formula (1) represents an ion bond].

[2] The nonaqueous electrolyte solution according to [1], wherein $R^1$ and $R^2$ in the general formula (1) each independently represents $POF_2$ or $SO_2F$.

[3] The nonaqueous electrolyte solution according to [1] or [2], wherein both $R^1$ and $R^2$ in the general formula (1) represent $SO_2F$.

[4] The nonaqueous electrolyte solution according to any one of [1] to [3], wherein $R^3$ and $R^4$ in the general formula (1) each independently represents a hydrogen atom, a lithium ion, a sodium ion, or a C1-4 linear or C3-4 branched alkyl group.

[5] The nonaqueous electrolyte solution according to any one of [1] to [4], wherein the compound represented by the general formula (1) is a compound represented by the following formula (1a).

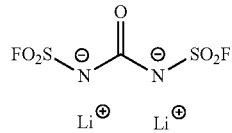
(1a)

[6] The nonaqueous electrolyte solution according to any one of [1] to [5], wherein the nonaqueous organic solvent contains at least one selected from the group consisting of a cyclic carbonate and a chain carbonate.

[7] The nonaqueous electrolyte solution according to [6], wherein the cyclic carbonate is at least one selected from the group consisting of ethylene carbonate, propylene carbonate and fluoroethylene carbonate, and the chain carbonate is at least one selected from the group consisting of ethylmethyl carbonate, dimethyl carbonate, diethyl carbonate and methylpropyl carbonate.

[8] The nonaqueous electrolyte solution according to any one of [1] to [7], wherein an amount of the compound represented by the general formula (1) with respect to the total amount of the compound represented by the general formula (1), the solute and the nonaqueous organic solvent is 0.01 mass % to 10.0 mass %.

[9] The nonaqueous electrolyte solution according to any one of [1] to [8], further containing at least one selected from vinylene carbonate, lithium bis(oxalato)borate, lithium difluoro(oxalato)borate, lithium difluorobis(oxalato)phosphate, lithium tetrafluoro(oxalato)phosphate, lithium bis(fluorosulfonyl)imide, lithium (difluorophosphoryl)(fluorosulfonyl)imide, 1,3-propenesultone and 1,3-propanesultone in an amount of 0.01 mass % to 5.0 mass % with respect to the total amount of the nonaqueous electrolyte solution.

[10] A nonaqueous electrolyte battery, comprising a positive electrode, a negative electrode, and the nonaqueous electrolyte solution according to any one of [1] to [9].

[11] A compound represented by the following formula (1a).

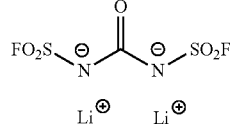
(1a)

Effect by the Invention

According to the present invention, it is possible to provide a nonaqueous electrolyte solution with a low initial resistance value when it is used in a nonaqueous electrolyte battery. It is also possible to provide a compound which can be suitably used for the above nonaqueous electrolyte solution.

DESCRIPTION OF EMBODIMENTS

Constitutions and combinations thereof in the following embodiments are merely described as examples, and various modifications may be made without departing from the gist of the present invention. In addition, the present invention is not limited by the embodiments, and limited only by the claims.

In the present specification, the term "-" or " - - - to - - - " is used to mean including the values described before and after it as the lower limit and upper limit.

In the present specification, the term "initial resistance value" represents a resistance value of a nonaqueous electrolyte battery immediately after charge and discharge operations which are initially performed to stabilize the battery. Specifically, it indicates a resistance value by impedance determination immediately after 3 cycles of charge and discharge operations to stabilize the battery.

[1. Nonaqueous Electrolyte Solution]

The nonaqueous electrolyte solution of the present invention is a nonaqueous electrolyte solution comprising a compound represented by the above general formula (1), a solute, and a nonaqueous organic solvent.

<(I) Compound Represented by the General Formula (1)>

The nonaqueous electrolyte solution of the present invention includes a compound represented by the general formula (1).

When a nonaqueous electrolyte solution including a compound represented by the general formula (1) is used for a nonaqueous electrolyte battery (e.g. a lithium ion secondary battery), the compound represented by the general formula (1) is decomposed on the positive electrode and negative electrode, and a film with a good ion conductivity is formed on the surfaces of the positive electrode and negative electrode. It is thought that this film suppresses the direct contact of the nonaqueous organic solvent or solute and electrode active materials to reduce a Li ion dissociation energy of the solute. Consequently, the present inventors presume that the effect of reducing the initial resistance of a nonaqueous electrolyte battery is displayed.

The compound represented by the general formula (1) will now be described.

In the general formula (1), $R^1$ and $R^2$ each independently represents $PO(R_f)_2$ or $SO_2R_f$.

$R_f$ represents a fluorine atom, or a C1-4 linear or C3-4 branched perfluoroalkyl group.

In case where $R_f$ represents a C1-4 linear or C3-4 branched perfluoroalkyl group, specific examples thereof include e.g. a trifluoromethyl group, a pentafluoroethyl group, a heptafluoropropyl group, a heptafluoroisopropyl group, a nonafluoro-n-butyl group and the like. Among them, a trifluoromethyl group is preferred.

$R_f$ preferably represents a fluorine atom.

Two $R_f$s in $PO(R_f)_2$ may be the same or different.

It is preferred that $R^1$ and $R_2$ each independently represents $POF_2$ or $SO_2F$, and it is preferred that both $R^1$ and $R^2$ represent $SO_2F$.

In the general formula (1), $R^3$ and $R^4$ each independently represents a hydrogen atom, a lithium ion, a sodium ion, a potassium ion, or a C1-12 linear or C3-12 branched alkyl group.

In case where $R^3$ and $R^4$ represent C1-12 linear or C3-12 branched alkyl groups, specific examples thereof include e.g. a methyl group, an ethyl group, an n-propyl group, an isopropyl group, an n-butyl group, a sec-butyl group, an isobutyl group, a tert-butyl group, an n-pentyl group and the like.

An oxygen atom may be included between the carbon atoms of the carbon atom-carbon atom bond in the above alkyl group. In case where an oxygen atom is included between the carbon atoms in the carbon atom-carbon atom bond in the above alkyl group, specific examples thereof include e.g. a 2-methoxyethyl group, a 2-ethoxyethyl group and the like.

An arbitrary hydrogen atom in the above alkyl group may be substituted by a fluorine atom. In case where an arbitrary hydrogen atom is substituted by a fluorine atom, examples of the alkyl group include a trifluoromethyl group, a difluoromethyl group, a fluoromethyl group, a 2,2,2-trifluoroethyl group, a 2,2-difluoroethyl group, a 2-fluoroethyl group, a 3-fluoropropyl group, a 3,3,3-trifluoropropyl group, a 2,2,3,3,3-pentafluoropropyl group, a 2,2,3,3-tetrafluoropropyl group, a hexafluoroisopropyl group and the like.

It is preferred that the above alkyl group be an alkyl group having 6 or less carbon atoms because resistance when a film is formed on electrodes can be lowered. The above alkyl group is more preferably an alkyl group having 4 or less carbon atoms, and particularly preferably a methyl group, an ethyl group, an n-propyl group, an isopropyl group, an n-butyl group, or a tert-butyl group.

$R^3$ and $R^4$ each independently represents preferably a hydrogen atom, a lithium ion, a sodium ion, or a C1-4 alkyl group, and more preferably a hydrogen atom, a lithium ion, a sodium ion, or a methyl group, and it is further preferred that both $R^3$ and $R^4$ represent lithium ions.

In addition, $R^3$ and $R^4$ may form a ring structure together with the nitrogen atoms to which they are bound. In this case, $R^3$ and $R^4$, together with each other, form a C2-4 alkylene group, an oxygen atom may be included between the carbon atoms of the carbon atom-carbon atom bond in the alkylene group, and a side chain thereof may have an alkyl group. In addition, an arbitrary hydrogen atom in the alkyl group and alkylene group may be substituted by a fluorine atom.

Examples of the alkylene group include an ethylene group, a propylene group and the like, and it is particularly preferably an ethylene group.

Specifically, the compound represented by the general formula (1) is preferably at least one selected from the group consisting of compounds represented by formulae (1a) to (1y), which will be specifically shown below.

It is more preferably at least one selected from the group consisting of a compound represented by formula (1a) (referred to as compound (1a)), a compound represented by formula (1b) (referred to as compound (1b)), a compound represented by formula (1c) (referred to as compound (1c)), a compound represented by formula (1e) (referred to as compound (1e)), a compound represented by formula (1p) (referred to as compound (1p)), and a compound represented by formula (1w) (referred to as compound (1w)), further preferably at least one selected from the group consisting of compound (1a), compound (1e) and compound (1w), and particularly preferably compound (1a).

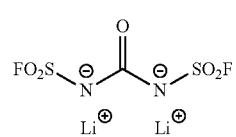
(1a)

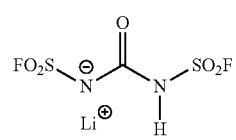
(1b)

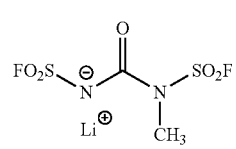
(1c)

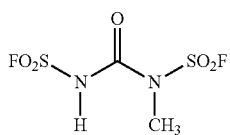 (1d)
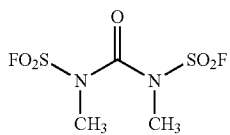 (1e)
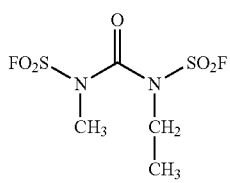 (1f)
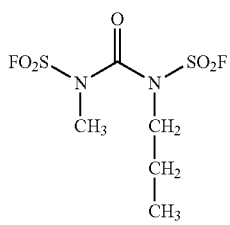 (1g)
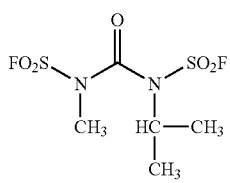 (1h)
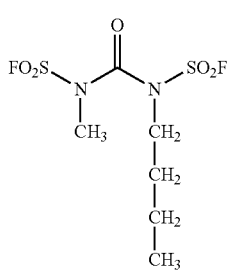 (1i)
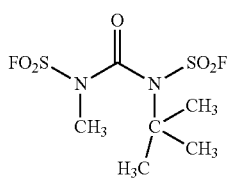 (1j)
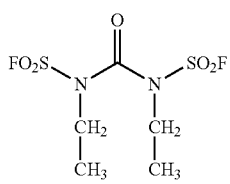 (1k)
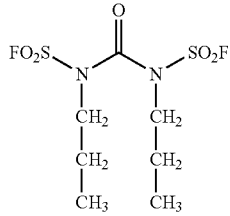 (1l)
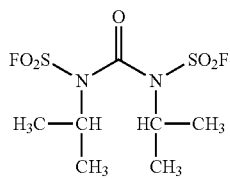 (1m)
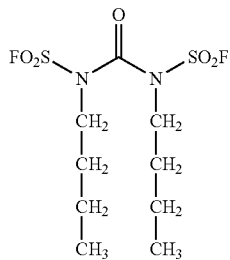 (1n)
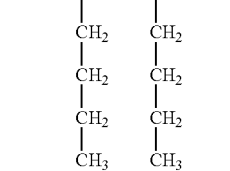 (1o)
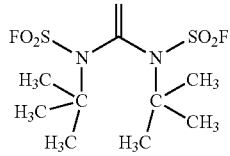 (1p)
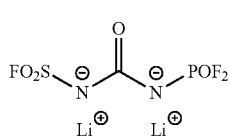 (1q)
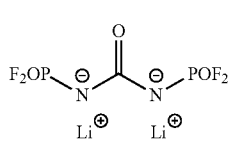 (1r)
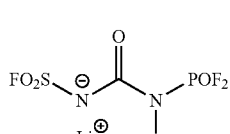 (1s)
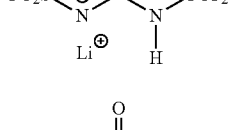 (1t)

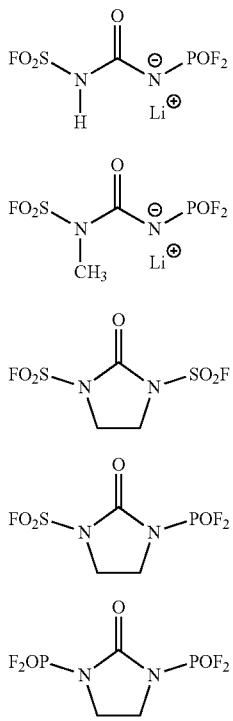

It should be noted that the present invention also relates to the above compound (1a).

In the nonaqueous electrolyte solution of the present invention, the above compound represented by the general formula (1) is preferably used as an additive.

In the nonaqueous electrolyte solution of the present invention, the total amount of the compound represented by the general formula (1) (hereinafter referred to as "concentration of compound represented by the general formula (1)") with respect to the total amount of the above compound represented by the general formula (1), a solute and a nonaqueous organic solvent (100 mass %) is, as the lower limit, preferably 0.01 mass % or more, more preferably 0.05 mass % or more, and further preferably 0.1 mass % or more. The upper limit of the concentration of the compound represented by the general formula (1) is preferably 10.0 mass % or less, more preferably 5.0 mass % or less, and further preferably 2.0 mass % or less.

When the concentration of the compound represented by the general formula (1) is 0.01 mass % or more, the effect of suppressing an increase in the initial resistance of a nonaqueous electrolyte battery using the nonaqueous electrolyte solution is easily obtained. Meanwhile, when the concentration of the compound represented by the general formula (1) is 10.0 mass % or less, an increase in the viscosity of the nonaqueous electrolyte solution can be suppressed, and the effect of improving high temperature cycle characteristics of a nonaqueous electrolyte battery using the nonaqueous electrolyte solution is easily obtained.

As one embodiment of the nonaqueous electrolyte solution of the present invention, so long as the concentration of the compound represented by the general formula (1) is not above 10.0 mass %, the compounds may be used singly or two or more of the compounds may be used in any combination at any ratio based on applications.

The method for synthesizing a compound represented by the above general formula (1) is not particularly limited, and the compound can be synthesized, for example, by the reaction of fluorosulfonyl isocyanate and water or the reaction of phosgene and methylsulfamoyl fluoride as described in Chemische Berichte (1968), 101 (1), 162-173, and Journal of Chemical Research, Synopses (1977), (10), 237.

Furthermore, the compound represented by the above general formula (1) wherein each of $R^3$ and $R^4$ represent a lithium ion, a sodium ion or a potassium ion can be synthesized by reaction with an inorganic base such as an alkali metal hydride ion.

<(II) Solute>

The nonaqueous electrolyte solution of the present invention comprises a solute.

The solute is not particularly limited and is preferably an ionic salt and more preferably an ionic salt including a fluorine atom.

For example, the solute is preferably an ionic salt comprising a pair of at least one cation selected from the group consisting of an alkali metal ion including a lithium ion and a sodium ion, an alkaline earth metal ion and quaternary ammonium, with at least one anion selected from the group consisting of a hexafluorophosphate anion a tetrafluoroborate anion, a perchlorate anion, a hexafluoroarsenate anion, a hexafluoroantimonate anion, a trifluoromethanesulfonate anion, a bis(trifluoromethanesulfonyl)imide anion, a bis(pentafluoroethanesulfonyl)imide anion, a (trifluoromethanesulfonyl)(pentafluoroethanesulfonyl)imide anion, a bis(fluorosulfonyl)imide anion, a (trifluoromethanesulfonyl)(fluorosulfonyl)imide anion, a (pentafluoroethanesulfonyl)(fluorosulfonyl)imide anion, a tris(trifluoromethanesulfonyl)methide anion, a bis(difluorophosphoryl)imide anion, a (difluorophosphoryl)(trifluoromethanesulfonyl)imide anion, a (difluorophosphoryl)(fluorosulfonyl)imide anion, and a difluorophosphate anion.

These solutes may be used singly or two or more of the solutes may be used in any combination at any ratio based on applications.

Among them, it is preferred that the cation be at least one selected from the group consisting of lithium, sodium, magnesium and quaternary ammonium, and the anion be at least one selected from the group consisting of a hexafluorophosphate anion, a tetrafluoroborate anion, a bis(trifluoromethanesulfonyl)imide anion, a bis(fluorosulfonyl)imide anion, a bis(difluorophosphoryl)imide anion, a (difluorophosphoryl)(fluorosulfonyl)imide anion, and a difluorophosphoric acid anion in respect of energy density, output characteristics, battery life and the like as a nonaqueous electrolyte battery.

The total amount of a solute in the nonaqueous electrolyte solution of the present invention (hereinafter, referred to as "solute concentration") is not particularly restricted, and the lower limit is preferably 0.5 mol/L or more, more preferably 0.7 mol/L or more, and further preferably 0.9 mol/L or more. The upper limit of the solute concentration is preferably 5.0 mol/L or less, more preferably 4.0 mol/L or less, and further preferably 2.0 mol/L or less. When the solute concentration is 0.5 mol/L or more, reductions in cycle characteristics and output characteristics of a nonaqueous electrolyte battery due to ion conductivity reduction can be suppressed, and when the solute concentration is 5.0 mol/L or less, an ion conductivity reduction due to an increase in the viscosity of the nonaqueous electrolyte solution and reductions in cycle characteristics and output characteristics of a nonaqueous electrolyte battery can be suppressed.

<(III) Nonaqueous Organic Solvent>

The type of nonaqueous organic solvent used for the nonaqueous electrolyte solution of the present invention is not particularly limited, and any nonaqueous organic solvent can be used.

Specifically, it is preferably at least one selected from the group consisting of ethylmethyl carbonate (hereinafter referred to as "EMC"), dimethyl carbonate (hereinafter referred to as "DMC"), diethyl carbonate (hereinafter referred to as "DEC"), methylpropyl carbonate, ethylpropyl carbonate, methylbutyl carbonate, 2,2,2-trifluoroethylmethyl carbonate, 2,2,2-trifluoroethylethyl carbonate, 2,2,2-trifluoroethylpropyl carbonate, bis(2,2,2-trifluoroethyl) carbonate, 1,1,1,3,3,3-hexafluoro-1-propylmethyl carbonate, 1,1,1,3,3,3-hexafluoro-1-propylethyl carbonate, 1,1,1,3,3,3-hexafluoro-1-propylpropyl carbonate, bis(1,1,1,3,3,3-hexafluoro-1-propyl) carbonate, ethylene carbonate (hereinafter referred to as "EC"), propylene carbonate (hereinafter referred to as "PC"), butylene carbonate, fluoroethylene carbonate (hereinafter referred to as "FEC"), difluoroethylene carbonate, methyl acetate, ethyl acetate, methyl propionate, ethyl propionate, methyl 2-fluoropropionate, ethyl 2-fluoropropionate, diethyl ether, dibutyl ether, diisopropyl ether, 1,2-dimethoxyethane, tetrahydrofuran, 2-methyltetrahydrofuran, furan, tetrahydropyran, 1,3-dioxane, 1,4-dioxane, N,N-dimethylformamide, acetonitrile, propionitrile, dimethyl sulfoxide, sulfolane, γ-butyrolactone, and γ-valerolactone.

In addition, an ionic liquid which takes a salt structure may be used as a nonaqueous organic solvent in the present invention.

In addition, it is preferred that the above nonaqueous organic solvent be at least one selected from the group consisting of a cyclic carbonate and a chain carbonate in that cycle characteristics at high temperatures are excellent. In addition, it is preferred that the above nonaqueous organic solvent be at least one selected from the group consisting of esters in that input and output characteristics at low temperatures are excellent.

Specific examples of the above cyclic carbonate include EC, PC, butylene carbonate, and FEC and the like, and among them, at least one selected from the group consisting of EC, PC and FEC is preferred.

Specific examples of the above chain carbonate include EMC, DMC, DEC, methylpropyl carbonate, ethylpropyl carbonate, 2,2,2-trifluoroethylmethyl carbonate, 2,2,2-trifluoroethylethyl carbonate, 1,1,1,3,3,3-hexafluoro-1-propylmethyl carbonate, and 1,1,1,3,3,3-hexafluoro-1-propylethyl carbonate, and the like, and among them, at least one selected from the group consisting of EMC, DMC, DEC, and methylpropyl carbonate is preferred.

In addition, specific examples of the above esters include methyl acetate, ethyl acetate, methyl propionate, ethyl propionate, methyl 2-f luoropropionate, and ethyl 2-fluoropropionate, and the like.

<Other Additives>

Additional components commonly used may be further added at any ratio to the nonaqueous electrolyte solution of the present invention without losing the gist of the present invention.

Specific examples of the other additives include compounds having the effect of preventing overcharge, the effect of forming a negative electrode film, and the effect of protecting a positive electrode such as cyclohexylbenzene, cyclohexylfluorobenzene, fluorobenzene, biphenyl, difluoroanisole, tert-butylbenzene, tert-amylbenzene, 2-fluorotoluene, 2-fluorobiphenyl, vinylene carbonate, dimethylvinylene carbonate, vinyl ethylene carbonate, fluoroethylene carbonate, trans-difluoroethylene carbonate, methyl propargyl carbonate, ethyl propargyl carbonate, dipropargyl carbonate, maleic anhydride, succinic anhydride, propanesultone, 1,3-propanesultone, 1,3-propenesultone, butanesultone, methylene methanedisulfonate, dimethylene methanedisulfonate, trimethylene methanedisulfonate, methyl methanesulfonate, 1,6-diisocyanatohexane, tris (trimethylsilyl)borate, succinonitrile, (ethoxy) pentafluorocyclotriphosphazene, lithium difluorobis(oxalato)phosphate, sodium difluorobis(oxalato)phosphate, potassium difluorobis(oxalato)phosphate, lithium difluoro(oxalato)borate, sodium difluoro(oxalato)borate, potassium difluoro(oxalato)borate, lithium bis(oxalato)borate, sodium bis(oxalato) borate, potassium bis(oxalato)borate, lithium tetrafluoro (oxalato)phosphate, sodium tetrafluoro(oxalato)phosphate, potassium tetrafluoro(oxalato)phosphate, lithium tris(oxalato)phosphate, lithium ethylfluorophosphate, lithium fluorophosphate, ethenesulfonyl fluoride, lithium fluorosulfonate, trifluoromethanesulfonyl fluoride, methanesulfonyl fluoride, and phenyl difluorophosphate.

The nonaqueous electrolyte solution of the present invention may include as the other additives, a compound represented by the following general formula (2):

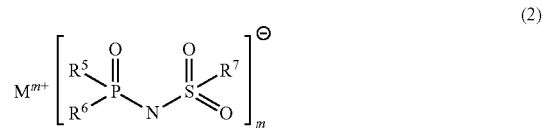

[in the general formula (2), $R^5$-$R^7$ each independently represents a fluorine atom, or an organic group selected from a C1-10 linear or branched alkyl group, a C1-10 linear or branched alkoxy group, a C2-10 alkenyl group, a C2-10 alkenyloxy group, a C2-10 alkynyl group, a C2-10 alkynyloxy group, a C3-10 cycloalkyl group, a C3-10 cycloalkoxy group, a C3-10 cycloalkenyl group, a C3-10 cycloalkenyloxy group, a C6-10 aryl group, and a C6-10 aryloxy group, wherein a fluorine atom, an oxygen atom or an unsaturated bond may exist in the organic group, provided that at least one of $R^5$ to $R^7$ represents a fluorine atom.

$M^{m+}$ represents an alkali metal cation, an alkaline earth metal cation, or an onium cation, and m represents an integer having the same number as the valence of the corresponding cation].

When the compound represented by the general formula (2) (a salt having an imide anion) has at least one P—F bond or S—F bond, excellent low temperature characteristics are obtained. The larger number of P—F bonds or S—F bonds in the above salt having an imide anion is more preferred in that low temperature characteristics can be further improved, and in the above salt having an imide anion represented by the general formula (2), a compound wherein all $R^5$ to $R^7$ are fluorine atoms is further preferred.

It is also preferred that in the above salt having an imide anion represented by the general formula (2),
at least one of $R^5$ to $R^7$ be a fluorine atom,
at least one of $R^5$ to $R^7$ be a compound selected from hydrocarbon groups having 6 or less carbon atoms which may have a fluorine atom.

It is also preferred that in the above salt having an imide anion represented by the general formula (2),
at least one of $R^5$ to $R^7$ be a fluorine atom, at least one of $R^5$ to $R^7$ be a compound selected from a methyl group, a methoxy group, an ethyl group, an ethoxy group, a propyl group, a propoxyl group, a vinyl group, an allyl group, an allyloxy group, an ethynyl group, a 2-propynyl group, a 2-propynyloxy group, a phenyl group, a phenyloxy group, a 2,2-difluoroethyl group, a 2,2-difluoroethyloxy group, a 2,2,2-trifluoroethyl group, a 2,2,2-trifluoroethyloxy group, a 2,2,3,3-tetrafluoropropyl group, a 2,2,3,3-tetrafluoropropyloxy group, a 1,1,1,3,3,3-hexafluoroisopropyl group, and a 1,1,1,3,3,3-hexafluoroisopropyloxy group.

The counter cation $M^{m+}$ of the above salt having an imide anion represented by the general formula (2) is preferably selected from the group consisting of a lithium ion, a sodium ion, a potassium ion and a tetraalkylammonium ion.

In addition, examples of the alkyl group and alkoxyl group represented by $R^5$ to $R^7$ in the above general formula (2) include C1-10 alkyl groups and fluorine-containing alkyl groups such as a methyl group, an ethyl group, a propyl group, an isopropyl group, a butyl group, a secondary butyl group, a tertiary butyl group, a pentyl group, a 2,2-difluoroethyl group, a 2,2,2-trifluoroethyl group, a 2,2,3,3-tetrafluoropropyl group, and a 1,1,1,3,3,3-hexafluoroisopropyl group, and alkoxy groups derived from these groups.

Examples of the alkenyl group and alkenyloxy group include C2-10 alkenyl groups and fluorine-containing alkenyl groups such as a vinyl group, an allyl group, a 1-propenyl group, an isopropenyl group, a 2-butenyl group, and a 1,3-butadienyl group, and alkenyloxy groups derived from these groups.

Examples of the alkynyl group and alkynyloxy group include C2-10 alkynyl groups and fluorine-containing alkynyl groups such as an ethynyl group, a 2-propynyl group and a 1,1-dimethyl-2-propynyl group, and alkynyloxy groups derived from these groups.

Examples of the cycloalkyl group and cycloalkoxy group include C3-10 cycloalkyl groups and fluorine-containing cycloalkyl groups such as a cyclopentyl group and a cyclohexyl group, and cycloalkoxy groups derived from these groups.

Examples of the cycloalkenyl group and cycloalkenyloxy group include C3-10 cycloalkenyl groups and fluorine-containing cycloalkenyl groups such as a cyclopentenyl group and a cyclohexenyl group, and cycloalkenyloxy groups derived from these groups.

Examples of the aryl group and aryloxy group include C6-10 aryl groups and fluorine-containing aryl groups such as a phenyl group, a tolyl group and a xylyl group, and aryloxy groups derived from these groups.

Specific examples of the above salt having an imide anion represented by the general formula (2) and the method for synthesizing the salt can include those described in WO2017/111143.

The amount of such other additives in the nonaqueous electrolyte solution is preferably 0.01 mass % or more and 8.0 mass % or less with respect to the total amount of the nonaqueous electrolyte solution.

In addition, the ionic salts mentioned as a solute can display the effect of forming a negative electrode film and the effect of protecting a positive electrode as "other additives" when the amount included in the nonaqueous electrolyte solution is smaller than 0.5 mol/L as the lower limit of a suitable concentration of the solute. In this case, the amount included in the nonaqueous electrolyte solution is preferably 0.01 mass % to 5.0 mass %.

Examples of the ionic salt in this case include lithium trifluoromethanesulfonate, sodium trifluoromethanesulfonate, potassium trifluoromethanesulfonate, magnesium trifluoromethanesulfonate, lithium bis(trifluoromethanesulfonyl)imide, sodium bis(trifluoromethanesulfonyl)imide, potassium bis(trifluoromethanesulfonyl)imide, magnesium bis(trifluoromethanesulfonyl)imide, lithium bis(fluorosulfonyl)imide, sodium bis(fluorosulfonyl)imide, potassium bis(fluorosulfonyl)imide, magnesium bis(fluorosulfonyl)imide, lithium (trifluoromethanesulfonyl)(fluorosulfonyl)imide, sodium (trifluoromethanesulfonyl)(fluorosulfonyl)imide, potassium (trifluoromethanesulfonyl)(fluorosulfonyl)imide, magnesium (trifluoromethanesulfonyl)(fluorosulfonyl)imide, lithium bis(difluorophosphoryl)imide, sodium bis(difluorophosphoryl)imide, potassium bis(difluorophosphoryl)imide, magnesium bis(difluorophosphoryl)imide, lithium (difluorophosphoryl)(fluorosulfonyl)imide, sodium (difluorophosphoryl)(fluorosulfonyl)imide, potassium (difluorophosphoryl)(fluorosulfonyl)imide, magnesium (difluorophosphoryl)(fluorosulfonyl)imide, lithium (difluorophosphoryl)(trifluoromethanesulfonyl)imide, sodium (difluorophosphoryl)(trifluoromethanesulfonyl)imide, potassium (difluorophosphoryl)(trifluoromethanesulfonyl)imide, magnesium (difluorophosphoryl)(trifluoromethanesulfonyl)imide, lithium difluorophosphate, sodium difluorophosphate, and the like.

In addition, alkali metal salts other than the above solutes (lithium salt, sodium salt, potassium salt and magnesium salt) may be used as additives.

Specific examples thereof include carboxylic acid salts such as lithium acrylate, sodium acrylate, lithium methacrylate, and sodium methacrylate, sulfuric acid ester salts such as lithium methyl sulfate, sodium methyl sulfate, lithium ethyl sulfate, sodium ethyl sulfate, and the like.

The nonaqueous electrolyte solution of the present invention preferably contains, among the above other additives, at least one selected from vinylene carbonate, lithium bis(oxalato)borate, lithium difluoro(oxalato)borate, lithium difluorobis(oxalato)phosphate, lithium tetrafluoro (oxalato) phosphate, lithium bis(fluorosulfonyl)imide, lithium (difluorophosphoryl)(fluorosulfonyl)imide, 1,3-propenesultone and 1,3-propanesultone in an amount of 0.01 mass % to 5.0 mass % with respect to the total amount of the nonaqueous electrolyte solution.

The nonaqueous electrolyte solution further preferably contains at least one selected from lithium difluoro(oxalato)borate, lithium (difluorophosphoryl)(fluorosulfonyl)imide and lithium difluorobis(oxalato)phosphate from the viewpoint of suppressing an increase in an initial resistance value.

In addition, the nonaqueous electrolyte solution of the present invention may include a polymer, and a pseudo solid of the nonaqueous electrolyte solution obtained using a gelling agent or a cross-linking polymer can be used as in the case of a nonaqueous electrolyte battery called polymer battery. In the polymer solid electrolytes, those containing a nonaqueous organic solvent as a plasticizing agent are also included.

The above polymer is not particularly limited so long as it is an aprotic polymer which can dissolve the above compound represented by the general formula (1), the above solute and the above other additives. Examples thereof include a polymer having polyethylene oxide as a main chain or a side chain, a homopolymer or copolymer of polyvinylidene fluoride, a methacrylic acid ester polymer, a polyacrylonitrile, and the like. When a plasticizing agent is added to these polymers, an aprotic nonaqueous organic solvent is preferred among the above nonaqueous organic solvents.

[2. Nonaqueous Electrolyte Battery]

The nonaqueous electrolyte battery of the present invention comprises at least the above nonaqueous electrolyte solution of the present invention, a negative electrode, and a positive electrode, and moreover preferably comprises a separator, packaging, and the like.

The negative electrode is not particularly limited, and materials into and from which an alkali metal ion such as a lithium ion or a sodium ion or an alkali earth metal ion can be reversibly inserted and extracted are preferably used.

The positive electrode is not particularly limited, and materials into and from which an alkali metal ion such as a lithium ion or a sodium ion or an alkali earth metal ion can be reversibly inserted and extracted are preferably used.

When the cation is lithium, for example, lithium metal, an alloy or intermetallic compound of lithium with another metal; and various carbon materials, metal oxides, metal nitrides, activated carbon, conductive polymers and the like, which can occlude and release lithium, are used as a negative electrode material. Examples of the above carbon materials include easily graphitizable carbon, difficultly graphitizable carbon with a (002) plane spacing of 0.37 nm or more (also called hard carbon), graphite with a (002) plane spacing of 0.37 nm or less, and the like, and as the latter, artificial graphite, natural graphite and the like are used.

When the cation is lithium, for example, lithium-containing transition metal composite oxide such as $LiCoO_2$, $LiNiO_2$, $LiMnO_2$ and $LiMn_2O_4$; these lithium-containing transition metal composite oxides wherein a plurality of transition metals such as Co, Mn and Ni are mixed; these lithium-containing transition metal composite oxides wherein a part of transition metals is replaced by a metal other than transition metals; phosphoric acid compounds of a transition metals such as $LiFePO_4$, $LiCoPO_4$ or $LiMnPO_4$ called olivine; oxides such as $TiO_2$, $V_2O_5$ or $MoO_3$; sulfides such as $TiS_2$ or FeS; and conductive polymers such as polyacetylene, polyparaphenylene, polyaniline, or polypyrrole; activated carbon; polymers which generate a radical; carbon materials and the like are used as a positive electrode material.

Acetylene black, ketjen black, carbon fibers or graphite as a conducting material, and polytetrafluoroethylene, polyvinylidene fluoride or SBR resin as a binding agent and the like are added to positive electrode materials and negative electrode materials, and moreover an electrode sheet molded in a sheet form may be used.

As a separator to prevent the contact of the positive electrode and negative electrode, polypropylene, polyethylene, paper, nonwoven fabric formed from e.g. glass fibers, or a porous sheet is used.

An electrochemical device in the form of e.g. coin, cylinder, square or aluminum laminate sheet is assembled from the above elements.

EXAMPLES

The present invention will now be described in more detail by way of examples. The scope of the present invention is not limited to these examples in any way.

Synthesis Example 1: Synthesis of Compound (1a)

To a 50 ml eggplant flask, 7.0 g of EMC and 0.07 g of water were added, and 1.00 g of fluorosulfonyl isocyanate was slowly added thereto. After completion of foaming, 0.07 g of lithium hydride was added, and the resultant mixture was stirred overnight. The reaction liquid was filtered to obtain 7.8 g of an EMC solution in which a target substance is dissolved at 14.7 mass % (target substance 0.8 g, yield 86%).

Compound (1a):

$^{19}$F-NMR [reference material; $CFCl_3$, deuterated solvent $CD_3CN$], δ ppm; 50.46 (s, 2F).

$^{13}$C-NMR [reference material; $CD_3CN$, deuterated solvent $CD_3CN$], δ ppm; 166.36 (s, 1C).

Preparation of Nonaqueous Electrolyte Solutions in Examples and Comparative Examples Comparative Example 1-1

(Preparation of $LiPF_6$ Solution)

In a glovebox at a dew point of −60° C. or lower, EC, FEC, EMC and DMC were mixed in a volume ratio of EC:FEC:EMC:DMC=2:1:3:4. Subsequently, $LiPF_6$ was added in an amount to reach a concentration of 1.0 mol/L with respect to the total amount of a nonaqueous electrolyte solution with the internal temperature maintained at 40° C. or lower, and completely dissolved by stirring to obtain a $LiPF_6$ solution. This was used as comparative nonaqueous electrolyte solution 1-1.

Example 1-1

(Preparation of Nonaqueous Electrolyte Solution 1-1)

In a glovebox at a dew point of −60° C. or lower, EC, FEC, EMC and DMC were mixed in a volume ratio of EC:FEC:EMC:DMC=2:1:3:4. Subsequently, $LiPF_6$ was added in an amount to reach a concentration of 1.0 mol/L with respect to the total amount of a nonaqueous electrolyte solution with the internal temperature maintained at 40° C. or lower. Compound (1a) corresponding to the compound represented by the general formula (1) was added thereto at a concentration of 0.5 mass % with respect to the total amount of the nonaqueous organic solvent, the solute and the compound (1a) and was dissolved by stirring for an hour to prepare nonaqueous electrolyte solution 1-1 in Example 1-1.

Examples 1-2 to 1-7 and Comparative Examples 1-2 to 1-5

(Preparation of Nonaqueous Electrolyte Solutions 1-2 to 1-7, and Comparative Nonaqueous Electrolyte Solutions 1-2 to 1-5)

The nonaqueous electrolyte solutions 1-2 to 1-7 and comparative nonaqueous electrolyte solutions 1-2 to 1-5 were prepared in the same manner as in the preparation of nonaqueous electrolyte solution 1-1, except that the type and amount added of each of the compounds represented by the general formula (1) (and comparative compounds) were changed as shown in Table 1.

Examples 2-1 to 2-3 and Comparative Examples 2-1 to 2-3

(Preparation of Nonaqueous Electrolyte Solutions 2-1 to 2-3 and Comparative Nonaqueous Electrolyte Solutions 2-1 to 2-3)

The nonaqueous electrolyte solutions 2-1 to 2-3 and comparative nonaqueous electrolyte solutions 2-1 to 2-3 were each prepared in the same manner as in the preparation of the nonaqueous electrolyte solutions 1-2, 1-5 and 1-7, and comparative nonaqueous electrolyte solutions 1-1, 1-3 and 1-5, except that vinylene carbonate was further added as the other additives so that the concentration is set as shown in Table 2 with respect to the total amount of the nonaqueous electrolyte solution.

Examples 3-1 to 3-3 and Comparative Examples 3-1 to 3-3

(Preparation of Nonaqueous Electrolyte Solutions 3-1 to 3-3 and Comparative Nonaqueous Electrolyte Solutions 3-1 to 3-3)

The nonaqueous electrolyte solutions 3-1 to 3-3 and comparative nonaqueous electrolyte solutions 3-1 to 3-3 were each prepared in the same manner as in the preparation of the nonaqueous electrolyte solutions 2-1 to 2-3 and comparative nonaqueous electrolyte solutions 2-1 to 2-3, except that vinylene carbonate was changed to lithium bis(oxalato)borate.

Examples 4-1 to 4-3 and Comparative Examples 4-1 to 4-3

(Preparation of Nonaqueous Electrolyte Solutions 4-1 to 4-3 and Comparative Nonaqueous Electrolyte Solutions 4-1 to 4-3)

The nonaqueous electrolyte solutions 4-1 to 4-3 and comparative nonaqueous electrolyte solutions 4-1 to 4-3 were each prepared in the same manner as in the preparation of the nonaqueous electrolyte solutions 2-1 to 2-3 and comparative nonaqueous electrolyte solutions 2-1 to 2-3, except that vinylene carbonate was changed to lithium difluoro(oxalato)borate.

Examples 5-1 to 5-3 and Comparative Examples 5-1 to 5-3

(Preparation of Nonaqueous Electrolyte Solutions 5-1 to 5-3 and Comparative Nonaqueous Electrolyte Solutions 5-1 to 5-3)

The nonaqueous electrolyte solutions 5-1 to 5-3 and comparative nonaqueous electrolyte solutions 5-1 to 5-3 were each prepared in the same manner as in the preparation of the nonaqueous electrolyte solutions 2-1 to 2-3 and comparative nonaqueous electrolyte solutions 2-1 to 2-3, except that vinylene carbonate was changed to lithium difluorobis(oxalato)phosphate.

Examples 6-1 to 6-3 and Comparative Examples 6-1 to 6-3

(Preparation of Nonaqueous Electrolyte Solutions 6-1 to 6-3 and Comparative Nonaqueous Electrolyte Solutions 6-1 to 6-3)

The nonaqueous electrolyte solutions 6-1 to 6-3 and comparative nonaqueous electrolyte solutions 6-1 to 6-3 were each prepared in the same manner as in the preparation of the nonaqueous electrolyte solutions 2-1 to 2-3 and comparative nonaqueous electrolyte solutions 2-1 to 2-3, except that vinylene carbonate was changed to lithium tetrafluoro(oxalato)phosphate.

Examples 7-1 to 7-3 and Comparative Examples 7-1 to 7-3

(Preparation of Nonaqueous Electrolyte Solutions 7-1 to 7-3 and Comparative Nonaqueous Electrolyte Solutions 7-1 to 7-3)

The nonaqueous electrolyte solutions 7-1 to 7-3 and comparative nonaqueous electrolyte solutions 7-1 to 7-3 were each prepared in the same manner as in the preparation of the nonaqueous electrolyte solutions 2-1 to 2-3 and comparative nonaqueous electrolyte solutions 2-1 to 2-3, except that vinylene carbonate was changed to lithium bis(fluorosulfonyl)imide.

Examples 8-1 to 8-3 and Comparative Examples 8-1 to 8-3

(Preparation of Nonaqueous Electrolyte Solutions 8-1 to 8-3 and Comparative Nonaqueous Electrolyte Solutions 8-1 to 8-3)

The nonaqueous electrolyte solutions 8-1 to 8-3 and comparative nonaqueous electrolyte solutions 8-1 to 8-3 were each prepared in the same manner as in the preparation of the nonaqueous electrolyte solutions 2-1 to 2-3 and comparative nonaqueous electrolyte solutions 2-1 to 2-3, except that vinylene carbonate was changed to 1,3-propenesultone.

In the following Tables 1 to 8, DFP means lithium difluorophosphate, FS means lithium fluorosulfonate, VC means vinylene carbonate, BOB means lithium bis(oxalato)borate, DFOB means lithium difluoro(oxalato) borate, DFBOP means lithium difluorobis(oxalato)phosphate, TFOP means lithium tetrafluoro(oxalato)phosphate, FSI means lithium bis(fluorosulfonyl)imide and PRS means 1,3-propenesultone.

In the following Tables 1 to 8, the added amount of the compound represented by the general formula (1) (and comparative compounds DFP and FS) indicates a concentration with respect to the total amount of a nonaqueous solvent, a solute, and such compound. In addition, the added amount of other additives indicates a concentration with respect to the total amount of a nonaqueous solvent, a solute, such compound and such other additives.

[Production of Nonaqueous Electrolyte Battery]
(Production of NCM622 Positive Electrode)

In 90 mass % of $LiNi_{0.6}Mn_{0.2}Co_{0.2}O_2$ powder, 5 mass % of polyvinylidene fluoride (hereinafter referred to as PVDF) as a binder and 5 mass % of acetylene black as a conducting material were mixed, and N-methyl-2-pyrrolidone was further added thereto to prepare a positive electrode mixture paste. This paste was applied onto both sides of aluminum foil (A1085), which was dried and pressed and then punched out at a size of 4 cm×5 cm to prepare a NCM622 positive electrode for tests.

(Production of Artificial Graphite Negative Electrode)

Ninety mass % of artificial graphite powder, 5 mass % of PVDF as a binder and 5 mass % of acetylene black as a conducting material were mixed to prepare a negative electrode mixture paste. This paste was applied onto one surface of copper foil, which was dried and pressed and then punched out at a size of 4 cm×5 cm to prepare an artificial graphite negative electrode for tests.

(Production of Nonaqueous Electrolyte Batteries)

A terminal was welded to the above-described NCM622 positive electrode under an argon atmosphere at a dew point of −50° C. or lower, and both sides thereof were then put between two polyethylene separators (5 cm×6 cm). Furthermore, the outsides thereof were put between two artificial graphite negative electrodes to which terminals had been welded in advance so that the surface of the negative electrode active material faces opposite to the surface of the positive electrode active material. They are put in an aluminum laminate bag having one opening left and the nonaqueous electrolyte solution was vacuum filled therein. After that, the opening was sealed with heat to produce an aluminum laminate-type nonaqueous electrolyte battery in each of Examples and Comparative Examples. The nonaqueous electrolyte solutions used are those described in Tables 1 to 8.

[Evaluation]

—Initial Charge and Discharge—

A nonaqueous electrolyte battery was put in a 25° C. constant temperature bath and, in this state, connected to a charge/discharge device. Charge was performed at 3 mA until 4.3 V. After 4.3 V was maintained for an hour, discharge was performed at 6 mA until 3.0 V. This was one charge and discharge cycle, and 3 cycles in total of charge and discharge were performed to stabilize the buttery.

<Measurement of Initial Resistance>

After the initial charge and discharge, the battery was charged at 25° C. and 6 mA until 4.3 V, and a resistance value was directly measured by impedance determination.

In each of Tables 1 to 8, the initial resistance value of Comparative Example using a comparative nonaqueous electrolyte solution to which neither a compound represented by the general formula (1) nor a comparative compound had been added (Comparative Example 1-1 in Table 1, Comparative Example 2-1 in Table 2, Comparative Example 3-1 in Table 3, Comparative Example 4-1 in Table 4, Comparative Example 5-1 in Table 5, Comparative Example 6-1 in Table 6, Comparative Example 7-1 in Table 7, Comparative Example 8-1 in Table 8) was used as 100, and the evaluation result of the initial resistance in each of Examples and Comparative Examples was shown as a relative value.

TABLE 1

| | Nonaqueous electrolyte solution | Compound represented by general formula (1) | | Other additives | | Initial resistance (relative value) |
|---|---|---|---|---|---|---|
| | | Type | Added amount [mass %] | Type | Added amount [mass %] | |
| Example 1-1 | Nonaqueous electrolyte solution 1-1 | (1a) | 0.5 | — | — | 70.1 |
| Example 1-2 | Nonaqueous electrolyte solution 1-2 | (1a) | 1.0 | — | — | 64.9 |
| Example 1-3 | Nonaqueous electrolyte solution 1-3 | (1e) | 0.3 | — | — | 83.6 |
| Example 1-4 | Nonaqueous electrolyte solution 1-4 | (1e) | 0.5 | — | — | 82.6 |
| Example 1-5 | Nonaqueous electrolyte solution 1-5 | (1e) | 1.0 | — | — | 78.6 |
| Example 1-6 | Nonaqueous electrolyte solution 1-6 | (1w) | 0.5 | — | — | 82.3 |
| Example 1-7 | Nonaqueous electrolyte solution 1-7 | (1w) | 1.0 | — | — | 78.3 |
| Comparative Example 1-1 | Comparative nonaqueous electrolyte solution 1-1 | — | — | — | — | 100 |
| Comparative Example 1-2 | Comparative nonaqueous electrolyte solution 1-2 | DFP | 0.5 | — | — | 87.6 |
| Comparative Example 1-3 | Comparative nonaqueous electrolyte solution 1-3 | DFP | 1.0 | — | — | 85.3 |
| Comparative Example 1-4 | Comparative nonaqueous electrolyte solution 1-4 | FS | 0.5 | — | — | 90.8 |
| Comparative Example 1-5 | Comparative nonaqueous electrolyte solution 1-5 | FS | 1.0 | — | — | 87.7 |

TABLE 2

| | Nonaqueous electrolyte solution | Compound represented by general formula (1) | | Other additives | | Initial resistance (relative value) |
|---|---|---|---|---|---|---|
| | | Type | Added amount [mass %] | Type | Added amount [mass %] | |
| Example 2-1 | Nonaqueous electrolyte solution 2-1 | (1a) | 1.0 | VC | 1.0 | 67.2 |
| Example 2-2 | Nonaqueous electrolyte solution 2-2 | (1e) | 1.0 | VC | 1.0 | 83.4 |
| Example 2-3 | Nonaqueous electrolyte solution 2-3 | (1w) | 1.0 | VC | 1.0 | 83.2 |
| Comparative Example 2-1 | Comparative nonaqueous electrolyte solution 2-1 | — | — | VC | 1.0 | 100 |
| Comparative Example 2-2 | Comparative nonaqueous electrolyte solution 2-2 | DFP | 1.0 | VC | 1.0 | 88.2 |
| Comparative Example 2-3 | Comparative nonaqueous electrolyte solution 2-3 | FS | 1.0 | VC | 1.0 | 90.7 |

TABLE 3

| | Nonaqueous electrolyte solution | Compound represented by general formula (1) | | Other additives | | Initial resistance (relative value) |
|---|---|---|---|---|---|---|
| | | Type | Added amount [mass %] | Type | Added amount [mass %] | |
| Example 3-1 | Nonaqueous electrolyte solution 3-1 | (1a) | 1.0 | BOB | 1.0 | 64.9 |
| Example 3-2 | Nonaqueous electrolyte solution 3-2 | (1e) | 1.0 | BOB | 1.0 | 66.3 |
| Example 3-3 | Nonaqueous electrolyte solution 3-3 | (1w) | 1.0 | BOB | 1.0 | 66.2 |
| Comparative Example 3-1 | Comparative nonaqueous electrolyte solution 3-1 | — | — | BOB | 1.0 | 100 |
| Comparative Example 3-2 | Comparative nonaqueous electrolyte solution 3-2 | DFP | 1.0 | BOB | 1.0 | 88.8 |
| Comparative Example 3-3 | Comparative nonaqueous electrolyte solution 3-3 | FS | 1.0 | BOB | 1.0 | 91.2 |

TABLE 4

| | Nonaqueous electrolyte solution | Compound represented by general formula (1) | | Other additives | | Initial resistance (relative value) |
|---|---|---|---|---|---|---|
| | | Type | Added amount [mass %] | Type | Added amount [mass %] | |
| Example 4-1 | Nonaqueous electrolyte solution 4-1 | (1a) | 1.0 | DFOB | 1.0 | 56.4 |
| Example 4-2 | Nonaqueous electrolyte solution 4-2 | (1e) | 1.0 | DFOB | 1.0 | 68.8 |
| Example 4-3 | Nonaqueous electrolyte solution 4-3 | (1w) | 1.0 | DFOB | 1.0 | 68.6 |
| Comparative Example 4-1 | Comparative nonaqueous electrolyte solution 4-1 | — | — | DFOB | 1.0 | 100 |
| Comparative Example 4-2 | Comparative nonaqueous electrolyte solution 4-2 | DFP | 1.0 | DFOB | 1.0 | 74.7 |
| Comparative Example 4-3 | Comparative nonaqueous electrolyte solution 4-3 | FS | 1.0 | DFOB | 1.0 | 76.8 |

TABLE 5

| | Nonaqueous electrolyte solution | Compound represented by general formula (1) | | Other additives | | Initial resistance (relative value) |
|---|---|---|---|---|---|---|
| | | Type | Added amount [mass %] | Type | Added amount [mass %] | |
| Example 5-1 | Nonaqueous electrolyte solution 5-1 | (1a) | 1.0 | DFBOP | 1.0 | 64.5 |
| Example 5-2 | Nonaqueous electrolyte solution 5-2 | (1e) | 1.0 | DFBOP | 1.0 | 80.7 |
| Example 5-3 | Nonaqueous electrolyte solution 5-3 | (1w) | 1.0 | DFBOP | 1.0 | 80.3 |
| Comparative Example 5-1 | Comparative nonaqueous electrolyte solution 5-1 | — | — | DFBOP | 1.0 | 100 |
| Comparative Example 5-2 | Comparative nonaqueous electrolyte solution 5-2 | DFP | 1.0 | DFBOP | 1.0 | 87.9 |
| Comparative Example 5-3 | Comparative nonaqueous electrolyte solution 5-3 | FS | 1.0 | DFBOP | 1.0 | 90.4 |

TABLE 6

| | Nonaqueous electrolyte solution | Compound represented by general formula (1) | | Other additives | | Initial resistance (relative value) |
|---|---|---|---|---|---|---|
| | | Type | Added amount [mass %] | Type | Added amount [mass %] | |
| Example 6-1 | Nonaqueous electrolyte solution 6-1 | (1a) | 1.0 | TFOP | 1.0 | 66.2 |
| Example 6-2 | Nonaqueous electrolyte solution 6-2 | (1e) | 1.0 | TFOP | 1.0 | 79.6 |
| Example 6-3 | Nonaqueous electrolyte solution 6-3 | (1w) | 1.0 | TFOP | 1.0 | 79.2 |
| Comparative Example 6-1 | Comparative nonaqueous electrolyte solution 6-1 | — | — | TFOP | 1.0 | 100 |
| Comparative Example 6-2 | Comparative nonaqueous electrolyte solution 6-2 | DFP | 1.0 | TFOP | 1.0 | 87.0 |
| Comparative Example 6-3 | Comparative nonaqueous electrolyte solution 6-3 | FS | 1.0 | TFOP | 1.0 | 90.1 |

TABLE 7

| | Nonaqueous electrolyte solution | Compound represented by general formula (1) | | Other additives | | Initial resistance (relative value) |
|---|---|---|---|---|---|---|
| | | Type | Added amount [mass %] | Type | Added amount [mass %] | |
| Example 7-1 | Nonaqueous electrolyte solution 7-1 | (1a) | 1.0 | FSI | 1.0 | 65.0 |
| Example 7-2 | Nonaqueous electrolyte solution 7-2 | (1e) | 1.0 | FSI | 1.0 | 82.9 |
| Example 7-3 | Nonaqueous electrolyte solution 7-3 | (1w) | 1.0 | FSI | 1.0 | 82.6 |
| Comparative Example 7-1 | Comparative nonaqueous electrolyte solution 7-1 | — | — | FSI | 1.0 | 100 |
| Comparative Example 7-2 | Comparative nonaqueous electrolyte solution 7-2 | DFP | 1.0 | FSI | 1.0 | 85.2 |
| Comparative Example 7-3 | Comparative nonaqueous electrolyte solution 7-3 | FS | 1.0 | FSI | 1.0 | 87.7 |

TABLE 8

| | Nonaqueous electrolyte solution | Compound represented by general formula (1) | | Other additives | | Initial resistance (relative value) |
|---|---|---|---|---|---|---|
| | | Type | Added amount [mass %] | Type | Added amount [mass %] | |
| Example 8-1 | Nonaqueous electrolyte solution 8-1 | (1a) | 1.0 | PRS | 1.0 | 68.7 |
| Example 8-2 | Nonaqueous electrolyte solution 8-2 | (1e) | 1.0 | PRS | 1.0 | 82.7 |
| Example 8-3 | Nonaqueous electrolyte solution 8-3 | (1w) | 1.0 | PRS | 1.0 | 82.5 |
| Comparative Example 8-1 | Comparative nonaqueous electrolyte solution 8-1 | — | — | PRS | 1.0 | 100 |
| Comparative Example 8-2 | Comparative nonaqueous electrolyte solution 8-2 | DFP | 1.0 | PRS | 1.0 | 86.8 |
| Comparative Example 8-3 | Comparative nonaqueous electrolyte solution 8-3 | FS | 1.0 | PRS | 1.0 | 87.8 |

As seen from Tables 1 to 8, it is found that a nonaqueous electrolyte battery comprising a nonaqueous electrolyte solution including a compound represented by the general formula (1) has low initial resistance and thus is excellent.

The invention claimed is:

1. A nonaqueous electrolyte solution, comprising a compound represented by the following general formula (1), a solute, and a nonaqueous organic solvent:

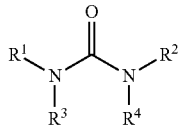

(1)

[in the general formula (1),

R$^1$ and R$^2$ each independently represents PO(R$_f$)$_2$ or SO$_2$R$_f$,

R$_f$s each independently represents a fluorine atom or a C1-4 linear or C3-4 branched perfluoroalkyl group, R$^3$ and R$^4$ each independently represents a hydrogen atom, a lithium ion, a sodium ion, a potassium ion, or a C1-12 linear or C3-12 branched alkyl group, wherein an oxygen atom may be included between the carbon atoms of the carbon atom-carbon atom bond in the alkyl group, or R$^3$ and R$^4$ form a ring structure together with the nitrogen atoms to which they are bound, wherein R$^3$ and R$^4$, together with each other, form an alkylene group; an oxygen atom may be included between the carbon atoms of the carbon atom-carbon atom bond in the alkylene group; a side chain thereof may have an alkyl group; and an arbitrary hydrogen atom in the alkyl group and alkylene group may be substituted by a fluorine atom, provided that in case where R$^3$ represents a lithium ion, a sodium ion or a potassium ion, a bond of the nitrogen atom and R$^3$ in the general formula (1) represents an ion bond, and in case where R$^4$ represents a lithium ion, a sodium ion or a potassium ion, a bond of the nitrogen atom and R$^4$ in the general formula (1) represents an ion bond].

2. The nonaqueous electrolyte solution according to claim 1, wherein R$^1$ and R$^2$ in the general formula (1) each independently represents POF$_2$ or SO$_2$F.

3. The nonaqueous electrolyte solution according to claim 1, wherein both R$^1$ and R$^2$ in the general formula (1) represent SO$_2$F.

4. The nonaqueous electrolyte solution according to claim 1, wherein R$^3$ and R$^4$ in the general formula (1) each independently represents a hydrogen atom, a lithium ion, a sodium ion, or a C1-4 linear or C3-4 branched alkyl group.

5. The nonaqueous electrolyte solution according to claim 1, wherein the compound represented by the general formula (1) is a compound represented by the following formula (1a)

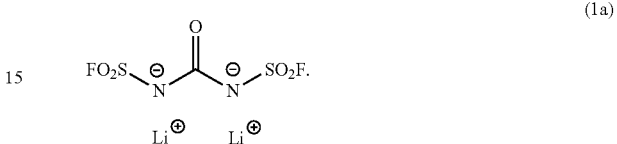

(1a)

6. The nonaqueous electrolyte solution according to claim 1, wherein the nonaqueous organic solvent contains at least one selected from the group consisting of a cyclic carbonate and a chain carbonate.

7. The nonaqueous electrolyte solution according to claim 6, wherein the cyclic carbonate is at least one selected from the group consisting of ethylene carbonate, propylene carbonate and fluoroethylene carbonate, and the chain carbonate is at least one selected from the group consisting of ethylmethyl carbonate, dimethyl carbonate, diethyl carbonate and methylpropyl carbonate.

8. The nonaqueous electrolyte solution according to claim 1, wherein an amount of the compound represented by the general formula (1) with respect to the total amount of the compound represented by the general formula (1), the solute, and the nonaqueous organic solvent is 0.01 mass % to 10.0 mass %.

9. The nonaqueous electrolyte solution according to claim 1, further containing at least one selected from vinylene carbonate, lithium bis(oxalato) borate, lithium difluoro(oxalato)borate, lithium difluorobis(oxalato)phosphate, lithium tetrafluoro(oxalato)phosphate, lithium bis(fluorosulfonyl)imide, lithium (difluorophosphoryl)(fluorosulfonyl)imide, 1,3-propenesultone and 1,3-propanesultone in an amount of 0.01 mass % to 5.0 mass % with respect to the total amount of the nonaqueous electrolyte solution.

10. A nonaqueous electrolyte battery, comprising a positive electrode, a negative electrode, and the nonaqueous electrolyte solution according to claim 1.

* * * * *